United States Patent Office 2,968,633
Patented Jan. 17, 1961

2,968,633

ADSORPTIVE POROUS MINERAL MASS AND METHOD OF MAKING SAME

James V. Weir, Milltown, N.J., assignor to Minerals & Chemicals Philipp Corporation, a corporation of Maryland No Drawing. Filed May 27, 1958, Ser. No. 738,002

7 Claims. (Cl. 252—455)

The present invention relates to porous adsorptive mineral masses useful in the separation of components from liquid organic mixtures. More specifically, this invention is concerned with the treatment of a porous mass of randomly oriented particles of a fibrous adsorptive mineral by the application thereto of a compressive force thereby to reduce the porosity of the mass and thus obtain an adsorbent mass having its efficiency and its utility improved over that of the mass not so treated.

The separation of liquid organic mixtures into two or more fractions through the use of solid adsorbents is an old art. The separation may be effected whenever the liquid contains components which have sufficient differences in sorbability by the adsorbent and the completeness of such a separation depends, among other things, upon the affinity of the adsorbent for the organic compounds to be separated. For example, highly polar organic compounds have been separated from less polar or nonpolar organic compounds by selective adsorption on various adsorbents. More specifically, known solid adsorbents have been used for removing tars, resins, color bodies and other undesirable components from hydrocarbons in the decolorization of lube oil, or from fats and oils of animal, vegetable or mineral origin, to desulfurize kerosene, gasoline and diesel fuel, and to separate or remove organic components from many other mixtures of organic liquids during the fractionation thereof.

Another important property of adsorbents relates to their ability to filter selectively certain molecular weight components from mixtures of organic liquids. This property is primarily a function of the equivalent pore diameter of the adsorbent mass. Thus it may be seen that it is very important to be able to adjust the porosity of the adsorbent to improve its selectivity in certain separation processes.

The adsorbents of the present invention are useful in commercial operations to carry out the fractionation or separation of mixtures of organic liquids by the so-called percolation or contact processes. In the former process the organic mixture is percolated or gravitated through a stationary bed of the granular adsorbent. In the latter process, the adsorbent is ground to a particle size which is usually finer than 100 mesh, mixed with the organic liquid and removed by sedimentation, filtration or similar means for separating the adsorbent and sorbed impurities from the residual organic liquid.

In the above-mentioned processes, the efficiencies of adsorbents are generally classified according to the various factors affecting their performance in the said processes. One such factor is the weight efficiency of the adsorbent, which is a measure of the quantity by weight of an adsorbent required to perform a desired separation of constitutents present in an organic liquid mixture, as for example, to decolorize a lube oil. Another and more important factor is the volume efficiency of the adsorbent which is based upon the same performance function as weight efficiency excepting that its measurement is based on the volume of adsorbent used. Yet another factor concerns the liquid retention of the adsorbent. Since the spent adsorbent is regenerated by washing, burning, blowing with an inert gas or a combination of such methods to remove the adsorbed matter, it is economically imperative that in such regeneration operations the adsorbent should retain a minimum of the purified liquid and a maximum of the removed impurities. Any loss of purified liquid adds directly to the cost of processing.

In view of the above-stated factors, many techniques have been developed to improve the various efficiencies of adsorbents. The techniques have largely involved chemical treatments of the minerals useful in the present invention, such as acid activation, with or without leaching, and various modifications of such treatments familiar to those skilled in the art.

Physical treatments of adsorbent minerals have largely involved the selection of ores, various grinding treatments, particle size grading, etc., and have been directed to making use of the best properties inherent in the mineral.

It is an object of the subject invention to provide a physical method for altering the nature of adsorbent mineral masses. It is another object of the instant invention to produce a physically altered porous adsorbent mineral mass. Another object is to improve the volume efficiency of a porous adsorbent mineral mass in organic liquid refining processes. Another object is to improve the selective filtration properties of porous adsorbent mineral masses. And yet another object is to reduce the liquid retention of a porous adsorbent mineral mass when used in organic liquid refining processes. These and additional objects will become evident from the detailed description of the invention which follows.

The present invention is the result of my discovery that a simple novel physical treatment of certain adsorbent minerals, hereafter described, unexpectedly alters the nature of the mineral in a manner such that the resultant product is superior in the properties mentioned above.

Although this invention is largely pertinent to an adsorbent useful in petroleum refining, it is to be understood that the nature of the product of the subject invention is such that it may be applied to various organic liquid purification processes with similar improvements resulting, and as such is not to be construed as being limited to any specific embodiment set forth in the present specification.

The present invention contemplates the following broadly stated steps in preparing porous masses according to the above-stated objects:

(1) Preparation of mineral mass for processing
(2) Adjustment of volatile matter content
(3) Compression
(4) Thermal activation
(5) Grinding and sizing The fibrous, adsorbent mineral useful in the practice of the subject invention is commonly called fuller's earth. This so-called earth may contain a great variety of mineral specie components depending upon its origin. The particular type of fuller's earth useful in the practice of the instant invention is that which is known as the Georgia-Florida variety, in which earth the mineral species attapulgite predominates. To a lesser extent, the mineral sepiolite is also present in this variety of fuller's earth; however, its properties, structure, composition, etc., are very similar to those of attapulgite, and for the purposes of the instant invention, these two mineral species may be considered equivalent. Since the subject invention has to do with the alteration of the attapulgite or sepiolite content of adsorbent masses, it is obvious that any variety of earth or ore characterized by the presence of these minerals is useful as a starting material in the practice of this invention.

The two mineral species attapulgite and sepiolite are magnesium aluminum silicates of fibrous or needle-like structure having exceedingly fine ultimate particle size, very high surface areas, the ability to undergo base exchange reactions with certain organic or inorganic compounds and to sorb a great variety of polar compounds. The adsorptive capacity of these minerals is a direct function of their surface areas. In addition, masses or aggregates of these fibrous adsorptive minerals also have the ability to filter selectively various molecular weight compounds from organic liquid mixtures as a result of the micropores and macropores formed between the randomly oriented fibrous particles thereof. The above-mentioned properties distinguish these mineral species and make them particularly suitable for use in adsorptive masses and especially in those of the present invention.

In the prior art practices, such as described in U.S. Patents 2,363,876, 2,231,328 and others, adsorptive masses are usually prepared from earths of the above-disclosed nature by drying, crushing, screening to obtain the desired particle size, and thermally activating at temperatures of the order of from 200° F. to 1400° F. The present invention contemplates the use of the above-stated practices and any of the many modifications thereof known to those skilled in the art. As examples of the variety of practices which may be employed to prepare the raw earth for use in practicing the present invention, the raw earth may be dried to a sufficient degree so that it may be pugged with water to form a plastic mass and then subjected to grinding, kneading or mixing action under substantial pressure, as by extrusion or after such comminuting operations may be mixed with additional water to settle out various impurities, float off organic matter or to wash out soluble impurities. Thus it may be seen that any suitable method of refining the raw earth may be used. It has been found, however, that the raw earth with a very minimum of refinement may be just as suitably employed and is the preferred material for obvious economic reasons.

A porous mass prepared for use by simply drying, crushing, screening and thermally activating the raw earth will have a porosity characteristic of its formation in nature. A reformed mass prepared, for example, by refining the earth by any of the hereinabove-mentioned processes, making a plastic mass of the earth, extruding in the form of pellets, activating, grinding and screening, may also be considered to be a mass as originally formed and amendable to adjustment according to the teachings of the instant invention. The masses as formed in nature or reformed by any of the many possible techniques known to those skilled in the art, generally have an equivalent pore diameter in the range of about 200 to about 300 Angstrom units (A.U.). The adjustment of the porous mass as taught herein is not limited, however, by the method used to form the mass, since it has been discovered that provided that as the volatile matter (V.M.) content of the mass is below about 34% by weight, the mass is compressible and accordingly its equivalent pore diameter is susceptible to reduction.

The term mass, as used herein, denotes any aggregation of randomly oriented particles of the fibrous mineral. Due to the exceedingly small ultimate particle size of the mineral (about one micron in length and about ⅕₅ to about ⅙₀ micron in cross section) it is apparent that masses as fine as 325 mesh (passing through openings of 44 microns) will contain a large number of such particles. Since such 325 mesh material is about the finest used in the various contact filtration processes this may be considered the lower limit of practical mass size although masses even smaller will exhibit the characteristic property of being a mass of randomly oriented particles of the fibrous mineral.

As a first step in the preparation of the adsorbent masses of the instant invention, the raw earth is dried to a volatile matter (V.M.) content of between about 10 and 34% by weight. By "volatile matter" is meant that part of the earth, chiefly water, which is driven off by heating at 1800° F. for 20 minutes. Although the volatile matter content of the earth is not critical in the range stipulated, it will become evident from the teachings that follow that the earth must not be calcined and dried to a point at which the minerals fuse, as a result of which their fibrous character is destroyed or the surface activity is appreciably diminished, nor should the earth contain excessive amounts of water which is incompressible and would prevent the orientation of the fibrous mineral particles to a more compact and less porous mass. If it is desired to adjust the V.M. content of the earth, water may be added to obtain any desired level within the range indicated.

After adjusting the V.M. content of the earth, it may then be ground to any conveniently handled particle size. Although very large particles may be used, it is preferable to have the earth ground to about at least −10 mesh but more uniform results are obtained when the earth is ground to −60 mesh. This finer particle size reduces the number of large voids which are created when the earth is loosely placed in a die, for example, and then compressed.

In compressing the earth, any suitable apparatus may be used which will confine a quantity of earth and enable the thus confined charge to be compressed. Although a rotary tablet machine, model BB-2, was used in the examples, other machines such as the Baldwin-Defiance model 20 compacting press, and the Stacomizer Press, which is a continuous hydraulic roller press, have been successfully used.

The pressure used is not of great consequence provided the surface area of the mass is not substantially reduced. Pressures up to and including 60 tons per square inch have been successfully used without materially altering the surface area of the mass; however, the preferable range is from 10 to 30 tons per square inch, in which range the maximum performance properties of the masses are developed.

In the compression step it has been found that minor quantities of a lubricant may be advantageously employed. When a die is filled with the earth and then compressed, oftentimes air is trapped which acts as a cushion and causes the compressed earth to explode from the die when pressure is released too rapidly. To overcome such difficulties, various organic waxes, fats and oils may be used in an amount of the order of from about 0.5 to about 5% by weight of the earth, with the preferred range being about 1% to about 3%. It is theorized that such materials lubricate the particles of earth and aid in the reorientation of the particles of the mass under compression, although the lubricant is largely effective in enabling the compressed material to be removed from the die in one piece. Specifically, hydrogenated vegetable oils have been successfully used although natural and synthetic waxes, animal, vegetable and mineral oils and their derivatives, such as amine soaps, sulfonates, etc., all of which are well-known for their lubricating properties and are completely combustible, are expected to be suitable. The only limitation to be applied to the lubricant is that of complete combustibility since those lubricants which would leave residues after thermal activation, such as, for example, metallic soaps, would reduce the adsorptive properties of the masses and may also contaminate the products which the masses are being used to purify.

In the compression step, it has been found that the fibrous mineral masses are reduced in equivalent pore diameter without substantial loss of surface area due to the fact that only the very large pores, which contribute very little to surface area, are collapsed more or less completely. Thus those pores in the range of 100 to 200 Angstrom units (A.U.) in diameter which predominate are only partly altered by a compressive force in the preferred range of 10 to 30 tons per square inch. It is this range of 100 to 200 A.U. equivalent pore diameter which is most useful in percolation and contact filtration processes and more specifically, the range of 100 to 150 A.U. equivalent pore diameter is preferred.

After the compression step, the compressed material may be heat activated by calcination at a temperature in the preferred range of 800° F. to 1200° F. and then grinding and sizing by screening or these last two steps may be reversed if desired. The range of granule size used in the percolation process varies with the equipment employed and the organic liquids to be purified, but generally granules in the range of —4 mesh to about +90 mesh are suitable and the range of —28 to +60 mesh may be considered average. In the contact filtration process the particle range may also be very broad but generally is —100 mesh and a range of 85% to 95% —200 mesh is most generally preferred.

The examples which follow serve to illustrate the preferred embodiments of the subject invention and to point out in detail the steps hereinabove discussed in general, but are not intended to be limiting upon the nature of the invention as set forth in the instant specification.

In the examples which follow, surface areas were measured by the low temperature nitrogen adsorption method of Brunauer, Emmet and Teller, Journal of the American Chemical Society, 60, 309–319 (1938). The calculations involved in obtaining the pore volume and equivalent pore diameter were those used by Heinemann, Krieger and McCarter in their paper "Some Physical Properties of Activated Bauxite," Industrial and Engineering Chemistry, 42, 529–533 (1950). The percolation decolorizing efficiency was determined by solution filtration of a mixture of 40% by volume of Pennsylvania "A" cylinder stock and 60% by volume of Varsol #1, which is a straight run mineral spirits of 315° F. to 400° F. distillation range, through a given weight of earth at 135° F. to 6 ASTM color. The volume of filtrate of 6 ASTM color thus obtained, as compared with the volume of filtrate of the same color obtained by filtration through a standard grade of fuller's earth, is indicative of the decolorizing efficiency of the earth. Space rates are reported as volume of liquid per volume of adsorbent per hour (v./v./hr.).

The commercial fuller's earth was produced by drying raw Georgia-Florida earth, grinding the dried material, screening to 28 to 60 mesh and calcining at 1100° F. for 30 minutes to from about 2% to about 4% V.M. content.

The examples of compressed earth were produced by mixing raw Georgia-Florida fuller's earth with water to obtain a 55% V.M. mixture. This mixture was pugged and extruded, to assure uniform water distribution, segregated into several batches and dried to the indicated V.M. contents. The thus dried material was then ground to —60 mesh and pilled on the Stokes model BB-2 rotary tablet machine at the pressures indicated. In the compression step a lubricant, Sterotex (hydrogenated peanut oil), was added to the ground, dried earth in the amounts indicated. After compression, the pills of earth were calcined at 1100° F., thus burning off the lubricant, and ground to 28 to 60 mesh. The fine material resulting from the grinding of the pills was ground to 100 mesh and finer for comparison in a contact process with the similarly treated standard fuller's earth granular residue.

The data of Table I illustrate the reduction in equivalent pore diameter of the attapulgite clay that was effected by compression. It will be seen from the data that compression of the order of from 10 to 22.5 tons per square inch resulted in products having surface areas of from 134 to 139 square meters per gram whereas the commercial fuller's earth had a surface area of 137 square meters per gram, which is generally representa- Table I

| Example | Percent V.M. Before Compression | Pressure of Compression, Tons/Inch.² | Pore Volume (cc./g.) | Surface Area (M.²/g.) | Equivalent Pore Diameter, Av. |
|---|---|---|---|---|---|
| 1 | 14.7 | 22.5 | 0.384 | 137 | 112 |
| 2 | 14.7 | 20.0 | 0.392 | 136 | 115 |
| 3 | 14.7 | 15.0 | 0.449 | 137 | 131 |
| 4 | 19.8 | 10.0 | 0.492 | 134 | 147 |
| 7 | 19.8 | 22.5 | 0.364 | 134 | 109 |
| 8 | 30.6 | 22.5 | 0.436 | 139 | 125 |
| 9 | 30.6 | 20.0 | 0.442 | 139 | 127 |
| 11 | 30.6 | 10.0 | 0.456 | 139 | 131 |
| 12 | 23.5 | 10.0 | 0.485 | 138 | 140 |
| 14 | 23.5 | 20.0 | 0.423 | 138 | 123 |
| 17 | 18.0 | 4.7 | 0.627 | ¹137 | 183 |
| 18 | 33.0 | 60.0 | 0.436 | ¹137 | 127 |
| Commercial fuller's earth | | | 0.692 | 137 | 202 |

¹ Assumed values.

tive of this product. The adsorbent products produced by compression favorably compare with the commercial product, showing substantially unreduced surface areas. It may be generally concluded from the data that the equivalent pore diameter is reduced as the compressive force is increased. The percent V.M. before compression does not seem to reveal a regular effect although, as mentioned earlier, V.M. contents in excess of about 34%, will prevent collapse of the larger pores (200 to 300 A.U. equivalent pore diameter) as is apparent from an inspection of Example 18. In Example 18, 60 tons per square inch pressure applied to the earth containing 33.0% V.M. produced a pore volume of 0.436 cc./g., whereas this same pore volume was obtained at 22.5 tons per square inch and 30.6% V.M. (Example 8). It is obvious, therefore, that the limit of compressibility is being reached as the V.M. content of the clay approaches about 34%.

Turning now to Table II, it is seen that the compressed earth is definitely superior to the commercial fuller's earth in the more important factor of volume efficiency. The minimum and maximum improvements in volume efficiencies obtained were 4.8% and 34.9%, respectively, for the compressed earth, as compared with the commercial fuller's earth. As hereinbefore mentioned, the volume efficiency is accepted in the industry as being the criterion of acceptable performance of an adsorbent since the capacity of equipment is increased directly with the percent increase in volume efficiency, operating times are extended at equal space rates, and fewer shutdowns are required for cleaning equipment and regenerating the adsorbent.

Although the weight efficiencies of the compressed earth examples were somewhat reduced, it is obvious that this does not represent a detrimental factor since the volume efficiencies are far in excess of those of the commercial earth.

The standard fuller's earth is included in Table II to show the basis upon which the earths were classified.

The space rates reported in Table II are all in excess of those used industrially. The higher space rates were employed in these laboratory tests since it was believed that the reduced pore diameter of the compressed earths would restrict the passage of liquid through the adsorbent granule; therefore, the higher space rates would necessarily indicate whether or not the reduction of pore diameter had a deleterious effect upon throughput or decolorization. The data indicate that at space rates approaching those commercially used (0.14 v./v./hr.) the adsorbents of the instant invention demonstrate efficiencies comparable to those at five times the minimum space rate reported. This demonstrates that the adsorbents of the instant invention are useful over a wide range of space rates and thus are adaptable to equipment and process modifications.

Table II

| Example | Percent V.M. Before Compression | Pressure of Compression, Tons/In.² | Percent Sterotex | Percent V.M. After 1,100° F./ 30 min. Calcination | Bulk Density (lbs./ft.³) Calcined 1,100° F./ 30 min. | Space Rate, v./v./hr. | Percent Weight Efficiency | Percent Volume Efficiency |
|---|---|---|---|---|---|---|---|---|
| 1 | 14.7 | 22.5 | 2 | 2.6 | 46.5 | 0.14 | 104.5 | 152.3 |
| 2 | 14.7 | 20.0 | 2 | 3.1 | 44.5 | 0.35 | 105.2 | 147.0 |
| 3 | 14.7 | 15.0 | 2 | 2.6 | 42.6 | 0.14 | 113.3 | 151.3 |
| 4 | 19.8 | 10.0 | 2 | 2.5 | 38.9 | 0.35 | 118.9 | 144.9 |
| 5 | 19.8 | 15.0 | 2 | 2.5 | 40.7 | 0.14 | 118.1 | 150.7 |
| 6 | 19.8 | 20.0 | 2 | 3.1 | 43.7 | 0.35 | 105.2 | 144.2 |
| 7 | 19.8 | 22.5 | 2 | 2.3 | 43.7 | 0.14 | 109.3 | 149.5 |
| 8 | 30.6 | 22.5 | 2 | 2.5 | 41.5 | 0.14 | 120.8 | 156. |
| 9 | 30.6 | 20.0 | 2 | 2.4 | 41.9 | 0.14 | 120.5 | 157.9 |
| 10 | 30.6 | 15.0 | 2 | 2.4 | 41.0 | 0.35 | 118.3 | 151.8 |
| 11 | 30.6 | 10.0 | 2 | 2.9 | 40.6 | 0.35 | 116.9 | 148.7 |
| 12 | 23.5 | 10.0 | 2 | 2.6 | 39.1 | 0.35 | 118.0 | 145.5 |
| 13 | 23.5 | 15.0 | 2 | 2.9 | 41.9 | 0.35 | 109.1 | 143.2 |
| 14 | 23.5 | 20.0 | 2 | 2.3 | 43.3 | 0.35 | 107.1 | 145.5 |
| 15 | 33.6 | 10.0 | 3 | 3.6 | 37.4 | 0.7 | 116.3 | 135.8 |
| 16 | 33.6 | 20.0 | 3 | 3.6 | 38.6 | 0.7 | 112.3 | 136.3 |
| 17 | 18.0 | 4.7 | | | 33.1 | | | |
| 18 | 33.0 | 60.0 | | | 41.4 | | | |
| Standard fuller's earth | | | | 2.1 | 32.0 | 0.14 | 100.0 | 100.0 |
| Commercial fuller's earth | 18 | 0 | | 2.0–3.0 | 31.0 | 0.14 | 135.0 | 131.0 |
| Do | 33 | 0 | | 2.0–3.0 | 32.0 | 0.14 | 123.0 | 123.0 |
| Do | 15 | 0 | | 2.0–3.0 | 31.3 | 0.7 | 133.0 | 130.2 |
| Do | 25 | 0 | | 2.0–3.0 | 31.3 | 0.14 | 132.2 | 129.8 |

Inspection of Table III reveals that the bulk densities of the compressed earths, when finely ground for contact filtration testing, are the same as those of the granular product. The data also show that the percent weight efficiencies are substantially equal to those obtained for the same examples of granular adsorbent, which indicates that volume efficiencies would also be equal as calculated from bulk density values. This shows then that the compressed earth has retained its characteristics when ground as fine as indicated by the screen analyses. The oil retention data show that the compressed earth generally contained less oil after the standard draining period than the standard fuller's earth.

Table III

| Example | Percent V.M. After 1,100° F./ 30 min. Calcination | Bulk Density, lbs./ft.³ | Dosage of earth to oil | Oil Retention | Average Percent Weight Efficiency | Screen Analysis Mesh, Percent |
|---|---|---|---|---|---|---|
| 3 | 3.7 | 42.6 | 8<br>13<br>20 | 76.3<br>78.1<br>67.9 | 113.5 | 100— 0.0<br>200—43.6<br>325—24.0<br>T/325—32.4 |
| 12 | 2.2 | 39.1 | 8<br>13<br>20 | 86.5<br>85.6<br>75.7 | 118.3 | 100— 0.0<br>200—40.0<br>325—24.4<br>T/325—35.6 |
| Standard fuller's earth | 3.6 | 35.0 | 8<br>13<br>20 | 83.5<br>100.1<br>89.6 | 100.0 | 100— 0.8<br>200—32.0<br>325—19.6<br>T/325—46.4 |
| Do | 3.3 | 34.5 | 8<br>13<br>20 | 86.0<br>82.9<br>97.6 | 100.0 | 100— 0.4<br>200—31.6<br>325—20.4<br>T/325—47.6 |

I claim:

1. An adsorptive porous mass useful in the separation of components of liquid organic mixtures comprising randomly oriented particles of a mineral selected from the group consisting of attapulgite and sepiolite, said mass having an equivalent pore diameter of from about 100 to about 150 A.U.

2. The adsorptive porous mass of claim 1 in which the mineral is attapulgite.

3. The adsorptive porous mass of claim 1 in which the mineral is sepiolite.

4. A method of adjusting the porosity of a mass of a mineral selected from the group consisting of attapulgite and sepiolite comprising the steps of adjusting the volatile matter content of said mass within the range of about 10 percent to about 34 percent, and then subjecting said mass to a compressive force of from about 10 to about 30 tons per square inch.

5. The method of claim 4 in which said mineral is attapulgite.

6. The method of claim 4 in which said mineral is sepiolite.

7. The method of claim 4 in which said mineral mass is mixed with a combustaible organic lubricant before being subject to said compressive force.

References Cited in the file of this patent

UNITED STATES PATENTS 2,833,727    Mavity _____ May 6, 1958